Patented Aug. 1, 1950

2,517,218

UNITED STATES PATENT OFFICE 2,517,218

POLYVINYL BUTYRAL COMPOSITION

Robert R. Lawrence, Ludlow, Mass., assignor to Monsanto Chemical Company, St. Louis, Mo., a corporation of Delaware No Drawing. Application March 23, 1946, Serial No. 656,780

10 Claims. (Cl. 260—41)

This invention relates to improved compositions of matter comprising polyvinyl butyraldehyde acetal resins.

It is an object of this invention to provide polyvinyl butyraldehyde acetal resin compositions having improved strength characteristics. A particular object of this invention is to provide improved polyvinyl butyraldehyde acetal resin compositions containing relatively large amounts of inorganic fillers.

These and other objects are attained according to this invention by incorporating large amounts of inorganic fillers in polyvinyl butyraldehyde acetal resins containing a plasticizer from the group consisting of tri-(2-ethyl-hexyl) phosphate, tri-(butoxy-ethyl) phosphate and di-(butoxy-ethyl) sebacate. Such compositions are characterized by unusually high tensile strengths, coupled with unusually high flexibility at low temperatures.

The following examples are illustrative of the present invention, but are not to be construed as limitative thereof. Where parts are specified, the parts are by weight.

The polyvinyl butyraldehyde acetal resin employed in the examples is prepared from a polyvinyl acetate of such a degree of polymerization that a 1-molar benzene solution possesses a viscosity of substantially 50–55 centipoises at 20° C. The polyvinyl butyraldehyde acetal resin contains, on a weight basis, 16–20% hydroxyl groups calculated as polyvinyl alcohol, less than 3% acetate groups calculated as polyvinyl acetate and the balance substantially butyraldehyde acetal.

The several ingredients in the examples may be mixed in any suitable manner to form the compositions of the invention. For example, all of the ingredients except the phenolic resin (where specified) are given a preliminary mixing in a Baker-Perkins mixer for about 20 minutes at room temperature to thoroughly disperse the several ingredients without colloiding the mixture. Thereafter, the mixture is charged into a Banbury mixer heated to 105° C. and mixed at this temperature for about 20 minutes. When phenolic resins or other curing agents are included in the composition, they are added after the mixing has proceeded for about 15 minutes, i. e., mixing is continued about 5 minutes after the curing agent is added. The colloided composition is finally transferred to constant speed mixing rolls and formed into slabs about ½" thick. Portions of the slab are molded into sheets about 0.075" in thickness by subjecting the composition in a suitable mold to heat and pressure. The physical data are obtained from test specimens cut from these sheets.

Example I 100 parts of polyvinyl butyraldehyde acetal resin are mixed with 100 parts of tri-(2-ethyl-hexyl) phosphate and 100 parts of powdered calcium carbonate in the manner described above. The resulting composition is a tough, abrasion-resistant material, having a tensile strength greatly in excess of a composition otherwise the same except that the calcium carbonate is omitted. In addition, the composition of this example exhibits elongation and low temperature flexibility values which are only slightly lower than those exhibited by a composition free from filler but otherwise identical.

Example II 100 parts of polyvinyl butyraldehyde acetal resin are mixed with 75 parts of tri-(butoxy-ethyl) phosphate and 65 parts of powdered calcium carbonate. The resulting composition exhibits unusual tensile strength while retaining substantially the same elongation and low temperature flexibility in comparison with a composition free from inert filler, but otherwise identical.

Example III 100 parts of polyvinyl butyraldehyde acetal resin are mixed with 75 parts of di-(butoxy-ethyl) sebacate and 125 parts of powdered calcium carbonate. The resulting composition exhibits the characteristic properties of the compositions of the invention, namely, high tensile strength coupled with an elongation and low temperature flexibility comparable to that of identical compositions, except for the omission of the inert inorganic filler.

The following examples illustrate compositions of the invention which are rendered thermosetting by the addition of thermosetting agents.

In the examples in Tables I and II, tensile strength and elongation values are obtained by means of A. S. T. S. test method D412–41T, using die C.

The stiffness values are obtained by means of a Clash-Berg apparatus for measuring stiffness in torsion. This testing equipment is described in the July, 1944, issue of Modern Plastics, starting at page 119.

In addition to the ingredients set forth in the examples in Tables I and II, each composition contains 25 parts of zinc oxide, 2 parts stearic acid and 10 parts of an oil soluble phenolic resin prepared by reacting diisobutyl phenol with formaldehyde under alkaline conditions. Similar results are obtained by using other phenolic resins such as a condensation product of substantially equimolecular proportions of phenol and formaldehyde under alkaline conditions.

*Table I*

|  | IV | IVa | V | Va | VI | VIa |
|---|---|---|---|---|---|---|
| Polyvinyl butyraldehyde acetal resin, parts | 100 | 100 | 100 | 100 | 100 | 100 |
| Tri-(2-ethyl-hexyl) phosphate, parts | 75 | 75 | 60 | 60 | | |
| Tri-(butoxy-ethyl) phosphate, parts | | | | | 25 | 25 |
| Di-(butoxy-ethyl) sebacate, parts | | | 60 | 60 | 75 | 75 |
| Butyl ricinoleate, parts | 25 | 25 | | | | |
| Calcium carbonate | 100 | | 65 | | 65 | |
| Tensile strength lbs. sq./in. | 1,200 | 730 | 1,030 | 485 | 1,305 | 495 |
| Elongation per cent | 390 | 450 | 410 | 355 | 380 | 360 |
| Stiffness values at −20° C. lbs. sq./in. | 7,000 | 5,450 | 2,200 | 1,820 | 4,150 | 4,050 |

*Table II*

|  | VII | VIIa | VIII | VIIIa |
|---|---|---|---|---|
| Polyvinyl butyraldehyde acetal resin parts | 100 | 100 | 100 | 100 |
| Tri-(butoxy-ethyl) phosphate parts | 50 | 50 | | |
| Methoxy-ethyl-acetyl ricinoleate parts | 50 | 50 | | |
| Butyl ricinoleate do | | | 60 | 60 |
| Glyceryl-monooleate do | | | 30 | 30 |
| Calcium Carbonate do | 100 | | 100 | |
| Tensile Strength lbs. sq./in. | 1,290 | 700 | 1,460 | 1,400 |
| Elongation per cent | 405 | 370 | 320 | 350 |
| Stiffness Values at −20° C. lbs. sq./in. | 2,500 | 1,900 | 16,000 | 11,600 |

Comparison of the tensile strengths in Examples IV, V, VI and VII with those in Examples IVa, Va, VIa and VIIa, respectively, clearly indicates the surprising results obtained according to this invention. In particular, it is to be noted that in contrast to Examples VIII and VIIIa, in which different plasticizers are employed, a remarkable increase in tensile strength is exhibited by the products in Examples IV–VII which include a substantial amount of either di-(2-ethyl-hexyl) phosphate, tri-(butoxy-ethyl) phosphate or di-(butoxy-ethyl) sebacate, or mixtures thereof, in combination with an inert inorganic filler.

The compositions of the invention may be formed into sheets or other articles or may be used for coating such materials as cloth, paper, wood, metal, glass, concrete, etc. Cloth, for example, may be advantageously coated and/or impregnated by calendering or by applying a solution or emulsion of the composition and then evaporating the solvent or dispersing medium as the case may be.

The compositions of the invention, particularly those compositions of the type set forth in Examples IV–VII are admirably suited for coating on textile fabrics, such as nylon twill (e. g. 1.6, 3.0 or 6.0 ounces per square yard) or cotton sheeting (e. g. 3.60 square yards per pound with a count of 56 x 56). Other fabrics which may be coated include wool, rayon, vinyl chloride-vinyl acetate copolymer fabrics, vinylidene chloride-vinyl chloride copolymer fabrics, and the like.

The plastic may be applied to the fabrics in any suitable manner, for example, the plastic may be placed on a two-roll rubber mill and heated to a temperature providing suitable plasticity, e. g., 100° C. Thereafter, the plastic is charged to a three or four-roll calender with roll temperatures of about 100° C. The coating is applied to the fabric between the bottom rolls. The coated fabric may then be reeled into rolls of desired size for storage and/or shipment. Generally, it is desirable to apply a material to the coated fabric to prevent sticking, as for example, talc.

Coated fabrics may be prepared having coatings of various thicknesses. For raincoat material, cotton sheeting of the type referred to above may have a coating weighing 5 ounces per square yard. As for the nylon twill (1.6 ounce) referred to above, a coating weight of 4 ounces per square yard may be advantageously applied.

When thermosetting coating compositions of the type disclosed in Examples IV–VII are used, the coatings may be readily cured to the alcohol-insoluble state by a short heating treatment, e. g., one hour at 135° C. The resulting products are characterized by being highly flexible and having a "soft feel" and at the same time exhibiting an exceptional resistance to abrasion. In this respect, cloth having a 0.003 inch thick thermoset coating of a composition as illustrated by the products in Examples IV–VII is vastly superior to natural rubber coatings of the same thickness. For example, the useful life of a raincoat made from such a natural rubber product is far less than when the products of the present invention are used. Especially outstanding are the products disclosed in Examples V and VI.

In addition, coated fabrics of the invention such as the cotton and nylon coated products discussed above exhibit remarkable resistance to weathering. For example, products having as a coating the composition of Examples IV–VII are still in excellent condition as regards flexibility at 0° F., after three months aging in Florida.

These coated fabrics are also characterized by excellent adhesion of the coating to the fabric, high tear strength before and after aging and the absence of "blocking," i. e., tendency of two layers to adhere to each other.

The polyvinyl butyraldehyde acetal resins used in the compositions of the invention may be prepared, for example, by hydrolyzing a polyvinyl ester, for example, polyvinyl acetate, and then reacting the resulting hydrolysis product with butyraldehyde. These resins may contain a certain proportion of ester and hydroxyl groups in addition to the acetal groups. U. S. patent to Morrison et al., Reissue 20,430, dated June 20, 1937, illustrates suitable methods for preparing polyvinyl acetal resins, in general.

When the polyvinyl butyraldehyde acetal resins contain ester groups, the nature of the ester groups may be substantially varied, but preferably such groups are residues of saturated lower aliphatic acids such as formic, acetic, propionic and butyric acids. The polyvinyl esters from which the polyvinyl acetal resins may be derived may vary substantially in degree of polymerization as evidenced by the viscosity of 1-molar benzene solutions. For example, such solutions may vary in viscosity from 5 to 75 centipoises at 20° C.

The polyvinyl butyraldehyde acetal resins contemplated according to the present invention have at least about 30% of the ester groups in the original polyvinyl ester replaced by acetal groups and do not have more than about 50% of said ester groups replaced by hydroxyl groups.

According to one embodiment of this invention, the polyvinyl acetal resins employed contain, on a weight basis, 5-25% hydroxyl groups calculated as polyvinyl alcohol, and preferably 10-20% hydroxyl groups. These resins may also contain up to 30% ester groups calculated as polyvinyl ester, the ester groups preferably being acetate groups.

For certain purposes, it is desirable that the resins employed contain, on a weight basis, 10-20% hydroxyl groups calculated as polyvinyl alcohol, and 15-30% acetate groups calculated as polyvinyl acetate and the balance substantially butyraldehyde acetal. For other purposes, it is preferred that the resin employed be made up, on a weight basis, of 16-20% hydroxyl groups calculated as polyvinyl alcohol, less than 3% acetate groups calculated as polyvinyl acetate and the balance substantially butyraldehyde acetal. For some purposes, the acetal resin is made up, on a weight basis, of 10-12% hydroxyl groups calculated as polyvinyl alcohol, less than 3% acetate groups calculated as polyvinyl acetate and the balance substantially butyraldehyde acetal.

In place of the phenol-aldehyde resins employed in the examples, resins made from other phenols and other aldehydes may be used. In general, the phenols used have at least 2 aldehyde-replaceable hydrogen atoms and the amounts of aldehyde is at least equivalent to the amount of phenol on a molar basis. As examples of phenols that may be used are phenol, orthocresol, para-cresol, para-tertiary butyl phenol, para-tertiary amyl phenol para-phenyl phenol, para-phenyl ethyl phenol prepared by reacting styrene with phenol, para-phenyl propyl phenol prepared by reacting alpha-methyl styrene with phenol, and the like. In place of formaldehyde, other aldehydes may be used such as acetaldehyde, propionaldehyde, benzaldehyde, crotonaldehyde, acrolein and the like.

In place of phenol-aldehyde condensation products, reaction products of aldehydes with nitrogen-containing compounds capable of forming methylol derivatives by reaction with formaldehyde may be used, as for example, such aminotriazine condensation products as those made by reacting melamine, ammeline or other aminotriazines containing two or more aldehyde-replaceable hydrogen atoms with formaldehyde or other aldehydes such as those mentioned above. Other condensation products include urea-aldehyde, dicyandiamide-aldehyde condensation products and the like. Such condensation products are designated in the art as aminoplasts and include not only the aldehyde reaction products per se, but the ethers of such products obtained by simultaneous or subsequent reaction with an alcohol such as methanol, ethanol, propanol, butanol and the like.

The proportion of aldehyde condensation product, such as those given above, may be substantially varied. For example, 2-50% may be used based on the amount of polyvinyl acetal resin. However, for the most purposes, 5-30% is found preferable.

When desired, the zinc oxide may be omitted from the compositions described in Examples IV—VII in preparing infusible insoluble compositions, but the curing time is thereby increased. Usually, it is found advisable to include zinc oxide, or another metal oxide such as magnesium oxide (MgO), tin oxide (SnO), antimony oxide ($Sb_2O_3$), chromium oxide ($Cr_2O_3$) and the like. The proportion of metal oxide found desirable is usually 5-30 parts for every 100 parts of polyvinyl butyraldehyde acetal resin.

It is to be understood that conventional types of additives and modifiers may be included in the compositions of the invention, (some of which have been shown in the examples), such as other plasticizers, resins, lubricants, fillers (e. g., carbon black), dyestuffs, pigments and the like. For example, the inclusion of 1-2 parts of a lubricant per 100 parts of acetal resin, as illustrated by the use of 2 parts of stearic acid in Examples IV—VII, is desirable to facilitate calendering or other forming processes.

Various commercial grades of calcium carbonate may be used. In place of powdered calcium carbonate, other inorganic inert fillers may be used such as various hard and soft clays, calcium silicate, barium sulfate, titanium dioxide, hydrated alumina and the like. However, calcium carbonate is the preferred filler. These fillers may have a varying degree of subdivision, but usually it is desirable that substantially all of the filler be of such a degree of fineness as to pass through a 100-mesh and, preferably, a 200-mesh screen. In order to achieve the unusual results of the invention, the filler should be employed in the proportion of 50 parts or more for every 100 parts of polyvinyl butyraldehyde acetal resin and usually it is desirable that not more than 150 parts of the filler be used for every 100 parts of acetal resin.

The proportion of plasticizer from the group specified hereinbefore which have unexpectedly led to the unusual strength results when used in combination with inert fillers, may be varied substantially, but the most unexpected results are obtained when at least 50 parts of a plasticizer for the group specified is employed for every 100 parts of acetal resin. In the case of di-(butoxy-ethyl) sebacate, the compatibility limit is usually reached when 80-90 parts are present as the sole plasticizer, but in the case of trioctyl phosphate and tri-(butoxy-ethyl) phosphate, up to 300 parts may be used without exceeding the compatibility limit. However, usually it is not advantageous to employ more than 150 parts for every 100 parts of acetal resin.

It is to be understood that the description of this invention is illustrative thereof and that variations may be made within the scope of the invention as defined in the appended claims.

What is claimed is:

1. A composition comprising a polyvinyl butyraldehyde acetal resin containing, on a chemical equivalent basis, at least 30% acetal groups and not more than 50% hydroxyl groups, a compatible amount which is at least 50 parts of, a plasticizer from the group consisting of tri-(2-ethyl-hexyl) phosphate, tri-(butoxy-ethyl) phosphate and di-(butoxy-ethyl) sebacate, and 50–150 parts of an inert, inorganic filler for every 100 parts of acetal resin.

2. A composition comprising a polyvinyl butyraldehyde acetal resin containing on a weight basis 5-25% hydroxyl groups calculated as polyvinyl alcohol, up to 30% acetate groups calculated as polyvinyl acetate and the balance substantially butyraldehyde acetal, a compatible amount which is at least 50 parts of a plasticizer from the group consisting of tri-(2-ethyl-hexyl) phosphate, tri-(butoxy-ethyl) phosphate and di-(butoxy-ethyl) sebacate, and 50–150 parts of an inert inorganic filler for every 100 parts of acetal resin.

3. A composition as defined in claim 2 in which the filler is calcium carbonate.

4. A composition as defined in claim 2 in which the plasticizer is tri-(2-ethyl-hexyl) phosphate.

5. A composition as defined in claim 2 in which the plasticizer is tri-(butoxy-ethyl) phosphate.

6. A composition of matter as defined in claim 2 in which the plasticizer is di-(butoxy-ethyl) sebacate.

7. A composition as defined in claim 2 in which the filler is calcium carbonate and the plasticizer is tri-(2-ethyl-hexyl) phosphate.

8. A composition as defined in claim 2 in which the filler is calcium carbonate and the plasticizer is tri-(butoxy-ethyl) phosphate.

9. A composition as defined in claim 2 in which the filler is calcium carbonate and the plasticizer is di-(butoxy ethyl) sebacate.

10. A fabric having a coating thereon comprising a composition containing 100 parts of a polyvinyl butyraldehyde acetal resin containing, on a weight basis, 5–25% hydroxyl groups calculated as polyvinyl alcohol, up to 30% acetate groups calculated as polyvinyl acetate and the balance substantially butyraldehyde acetal, a compatible amount which is at least 50 parts of a plasticizer from the group consisting of tri-(2-ethyl-hexyl) phosphate, tri-(butoxy-ethyl) phosphate and di-(butoxy-ethyl) sebacate, 50–150 parts of an inert inorganic filler and 2–50 parts of a thermosetting agent comprising a phenol-aldehyde condensation product.

ROBERT R. LAWRENCE.

REFERENCES CITED

The following references are of record in the file of this patent:

UNITED STATES PATENTS

| Number | Name | Date |
|---|---|---|
| 2,124,315 | Ryan | July 19, 1938 |
| 2,396,098 | Haas | Mar. 5, 1946 |
| 2,406,802 | Carruthers | Sept. 3, 1946 |